March 3, 1942.   J. J. GREBE   2,275,044
PREPARATION OF PHENOLS
Filed July 3, 1939
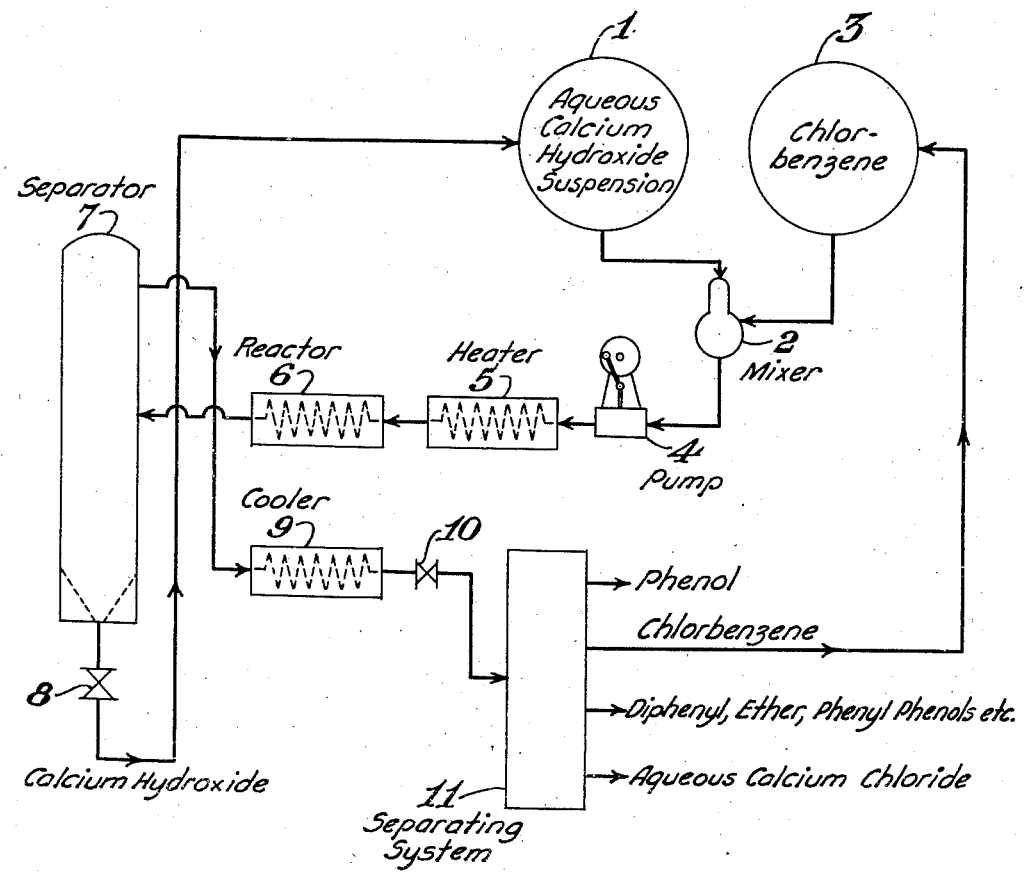
INVENTOR
John J. Grebe
BY Griswold + Burdick
ATTORNEYS Patented Mar. 3, 1942

2,275,044

UNITED STATES PATENT OFFICE 2,275,044

PREPARATION OF PHENOLS

John J. Grebe, Midland, Mich., assignor to The Dow Chemical Company, Midland, Mich., a corporation of Michigan Application July 3, 1939, Serial No. 282,622

8 Claims. (Cl. 260—629)

This invention concerns the preparation of phenolic compounds and more particularly relates to an improved method for preparing such compounds by the hydrolysis of aryl halides with calcium hydroxide.

In the known method of making phenols, e. g. phenol, cresols, naphthols, etc., by heating the corresponding aryl halide under pressure at an elevated temperature with an excess of calcium hydroxide in aqueous suspension, the phenol is present in the reaction product largely in the form of a calcium salt which is dissolved in the aqueous medium. According to the usual procedure, the phenol is recovered by acidifying the reaction product with a mineral acid to decompose the calcium phenolate and liberate the free phenol, and the latter is separated from the acidified mixture by distillation with steam.

I have now found that at elevated pressures and temperatures and in the presence of water, calcium phenolates are almost completely hydrolyzed. The reaction,

Ca(OR)$_2$+2HOH⇌Ca(OH)$_2$+2ROH wherein R represents an aryl radical, is an equilibrium reaction, and, at temperatures considerably above the atmospheric boiling point of an aqueous mixture of calcium hydroxide and the phenolic compound, proceeds in the left to right direction. At such temperatures, the calcium hydroxide is substantially insoluble in the aqueous medium. This discovery enables a free phenol to be separated directly from the reaction mixture obtained by hydrolyzing an aryl halide with aqueous calcium hydroxide simply by separating the phenol from the insoluble calcium hydroxide at a temperature above that at which the latter is appreciably soluble in the mixture. Since the cost of acid and the extra step of acidification are thus saved, it will be seen that such mode of operation effects an important economy in manufacturing costs. A further advantage is that the calcium hydroxide is recovered in a form which can be re-used for hydrolyzing the aryl halide, whereas it would be destroyed if acidification were employed.

The invention, then, consists in the improved method or process for preparing phenols fully described in the accompanying drawing and specification, and particularly pointed out in the claims.

In said drawing:

The single figure is a diagrammatic representation of an arrangement of apparatus employed in carrying out a preferred embodiment of the invention.

In preparing phenolic compounds by the hydrolysis of an aryl halide with aqueous calcium hydroxide according to the invention, the reaction may be carried out in continuous or discontinuous manner. When operating continuously, a reaction mixture consisting of the aryl halide and approximately one molecular equivalent of calcium hydroxide in an 8 to 10 per cent aqueous suspension is pumped through a tubular autoclave system in the presence of catalytically active copper under a pressure of 2000–3000 pounds per square inch at a temperature between 300° C. and 375° C., the rate of flow being regulated so that the time of passage through the autoclave is approximately 15 to 45 minutes. When operating discontinuously, or in batchwise manner, the reaction mixture is charged into a pressure vessel and heated at 300° to 375° C. for 15 to 45 minutes under the autogenous pressure of the mixture. The actual proportions of materials and conditions may be varied more or less, as desired, depending upon the particular aryl halide to be hydrolyzed.

At the reaction temperature, the product consists of a precipitate of calcium hydroxide suspended in a liquid phase containing water, free phenol and small amounts of unreacted aryl halide, aryl ether, etc., calcium halide being dissolved in the water. This mixed product is treated while still hot and under pressure to permit the calcium hydroxide to settle out. The precipitate is removed as an underflow concentrated suspension or slurry, and the liquid phase is further cooled and allowed to separate into an organic layer and an aqueous layer from which the phenol and other components are recovered in usual manner by decantation, extraction, or distillation, or a combination of such operations.

A preferred embodiment of the improved process as applied to the preparation of phenol from chlorbenzene is illustrated in the drawing, to which reference is made. An 8–10 per cent by weight aqueous suspension of calcium hydroxide is led continuously from storage tank 1 into a mixer 2, shown as of the injector type, where it is thoroughly mixed with an approximately equimolecular proportion of chlorbenzene, which is continuously fed to the mixer from storage tank 3. The mixture is then pumped by means of a high-pressure pump 4 under a pressure of approximately 2000–3000 pounds per square inch through heater 5, where it is heated to a reaction temperature of approximately 300°–375° C., and into the tubular reactor 6, insulated against loss of heat, where the hydrolysis reaction takes place. Sufficient heat is generated here to maintain the reaction temperature without adding more heat. The reactor 6 preferably contains surfaces of catalytically active copper, although, if desired, a catalytic copper compound may be included in the reaction mixture. For example, a small amount of cuprous oxide may be added to the calcium hydroxide suspension in storage tank 1. The rate of flow is regulated such that reaction is substantially complete as the mixture passes without release of pressure from the reactor 6 into separator 7 where the insoluble calcium hydroxide is permitted to settle. At this point, since no heat is added or generated in the mixture, the heavy precipitate settles rapidly, while the temperature of the mixture falls gradually. The calcium hydroxide is continuously withdrawn from the separator as a thick slurry by means of a discharge lock or throttling device 8 and is returned to the calcium hydroxide storage tank 1 to be reused in the process. The liquid product, while still hot, e. g. at about 175° C. or above, is withdrawn from the top of the separator and passed through a cooler 9, where it is cooled to a temperature preferably below its atmospheric boiling point, and then through a pressure relief valve 10 into the separating system 11, where the organic constituents are separated from the aqueous calcium chloride solution and from each other. Here the liquid separates into two layers, an organic layer containing free phenol, unreacted chlorbenzene, phenyl ether, etc., and an aqueous layer composed of a solution of calcium chloride containing some dissolved phenol. The separation of the components can be carried out according to the conventional practice, for instance, by decanting the separating layers and distilling or extracting. Chlorbenzene recovered from the product is returned to the start of the process.

In similar manner, other phenols may be prepared directly from the corresponding aryl chlorides or bromides. For example, cresols are prepared from chlor- or brom-toluenes, xylenols from halo-xylenes, phenyl phenols from halo-diphenyls, naphthols from halo-naphthalenes, etc.

It will be understood that the process just described serves by way of example only that the invention is not limited to the particular operating details herein disclosed or to the specific arrangement of apparatus shown in the drawing. For example, a portion of the aryl ether by-product may be added to the reaction mixture in order to repress the formation of such ether during the reaction. Similarly, the liquid reaction mixture may be separated from the insoluble calcium hydroxide in the separator by filtration or distillation. Also, the reactor and separator may be so combined that the hydrolysis reaction and separation of the excess calcium hydroxide take place in the same piece of equipment. Other modifications within the scope of the invention will be apparent to those skilled in the art.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. In a process for the preparation of a phenol wherein an aryl halide is reacted with aqueous calcium hydroxide at a temperature substantially above the normal boiling point of the mixture and under a pressure substantially above atmospheric, the steps which consist in holding the reaction mixture at said temperature and pressure while separating insoluble calcium hydroxide from the liquid mixture containing the free phenol, and separating the free phenol from said liquid mixture.

2. In a process for the preparation of a phenol wherein an aryl halide is reacted with aqueous calcium hydroxide at a temperature substantially above the normal boiling point of the mixture and a pressure substantially above atmospheric, the steps which consist in holding the reaction mixture at said temperature and pressure in a settling zone after completion of the reaction to permit isoluble calcium hydroxide to settle out, withdrawing an aqueous slurry of calcium hydroxide from the lower part of said zone to separate the same from the liquid mixture containing the free phenol, and separating the free phenol from said liquid mixture.

3. In a process for the preparation of phenol wherein a halo-benzene is reacted with aqueous calcium hydroxide at a temperature substantially above the normal boiling point of the mixture and under a pressure substantially above atmospheric, the steps which consist in holding the reaction mixture at said temperature and pressure in a settling zone after completion of the reaction to permit insoluble calcium hydroxide to settle out, withdrawing an aqueous slurry of calcium hydroxide from the lower part of said zone to separate the same from the liquid mixture containing free phenol, and separating the free phenol from said liquid mixture.

4. In a process for the preparation of phenol wherein chlorbenzene is heated under pressure at a temperature between about 300° C. and about 375° C. with aqueous calcium hydroxide, the steps which consist in holding the hot reaction mixture under pressure in a settling zone after the completion of the reaction at a temperature above 175° C. to permit insoluble calcium hydroxide to settle out, withdrawing an aqueous slurry of calcium hydroxide from the lower part of said zone to separate the same from the liquid mixture containing the free phenol, and separating the free phenol from said liquid mixture.

5. The method of making a phenol which comprises heating an aqueous mixture of an aryl halide and calcium hydroxide at a temperature between about 300° C. and about 375° C. and under a pressure at least equal to the autogenous pressure of the mixture at said temperature until reaction is complete, passing the hot reaction mixture into a zone where it is maintained at a temperature above 175° C. while insoluble calcium hydroxide is separated from the mixture containing the free phenol, and separating the free phenol from the liquid mixture.

6. The method of making a phenol which comprises heating an aqueous mixture of an aryl halide and calcium hydroxide at a temperature between about 300° C. and about 375° C. and under a pressure at least equal to the autogenous pressure of the mixture at said temperature until reaction is complete, passing the hot reaction mixture into a settling zone where it is maintained at a temperature above 175° C. to permit calcium hydroxide to settle out, withdrawing an aqueous slurry of calcium hydroxide from the lower part of said zone to separate the same from the liquid mixture containing the free phenol, and separating the free phenol from said liquid mixture.

7. The method of making phenol which comprises heating a halo-benzene at a temperature between about 300° C. and about 375° C. and under a pressure at least equal to the autogenous pressure of the mixture at said temperature until reaction is complete, passing the hot reaction mixture into a settling zone where it is maintained at a temperature above 175° C. to permit calcium hydroxide to settle out, withdrawing an aqueous slurry of calcium hydroxide from the lower part of said zone to separate the same from the liquid mixture containing free phenol, and separating free phenol from said liquid mixture.

8. The method of making phenol which comprises heating chlorbenzene at a temperature between about 300° C. and about 375° C. and under a pressure at least equal to the autogenous pressure of the mixture at said temperature until reaction is complete, passing the hot reaction mixture into a settling zone where it is maintained at a temperature above 175° C. to permit calcium hydroxide to settle out, withdrawing an aqueous slurry of calcium hydroxide from the lower part of said zone to separate the same from the liquid mixture containing free phenol, and separating free phenol from said liquid mixture.

JOHN J. GREBE.